(12) United States Patent
Van Schaftingen et al.

(10) Patent No.: US 9,810,121 B2
(45) Date of Patent: Nov. 7, 2017

(54) ENGINE EXHAUST GAS ADDITIVE STORAGE SYSTEM

(75) Inventors: Jules-Joseph Van Schaftingen, Wavre (BE); Joel Op De Beeck, Lint (BE); Jae Sik Choi, Hoeilaart (BE)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 1105 days.

(21) Appl. No.: 13/996,325

(22) PCT Filed: Dec. 21, 2011

(86) PCT No.: PCT/EP2011/073546
§ 371 (c)(1),
(2), (4) Date: Sep. 5, 2013

(87) PCT Pub. No.: WO2012/085053
PCT Pub. Date: Jun. 28, 2012

(65) Prior Publication Data
US 2013/0334077 A1    Dec. 19, 2013

(30) Foreign Application Priority Data

Dec. 23, 2010   (EP) .................................... 10196840
Jan. 11, 2011   (EP) .................................... 11150661

(51) Int. Cl.
*F01N 3/00*    (2006.01)
*F01N 3/20*    (2006.01)
(Continued)

(52) U.S. Cl.
CPC ............. *F01N 3/2066* (2013.01); *F01N 3/00* (2013.01); *F01N 13/16* (2013.01);
(Continued)

(58) Field of Classification Search
CPC .......... F01N 13/16; F01N 3/00; F01N 3/2066; F01N 2530/18; F01N 2610/10;
(Continued)

(56) References Cited

U.S. PATENT DOCUMENTS 2,817,737 A * 12/1957 Morris .................... H05B 3/00
219/545
3,796,858 A *  3/1974 Cohn ................... A01K 63/065
119/256

(Continued)

FOREIGN PATENT DOCUMENTS

DE          10256727 A1 *  6/2004
DE     102007041524 A1 *  3/2009
(Continued)

OTHER PUBLICATIONS

Machine translation of Japan Patent document No. 2000-027,627, Jun. 2016.*
(Continued)

*Primary Examiner* — Geoffrey S Evans
(74) *Attorney, Agent, or Firm* — Oblon, McClelland, Maier & Neustadt, L.L.P.

(57) ABSTRACT

A system for storing an internal combustion engine exhaust gas liquid additive, and including a tank for storing the additive, the tank including two halve shells manufactured as two separate parts that are assembled, at least one of the shells including an active component fixed inside of it.

15 Claims, 5 Drawing Sheets

Figure 1:
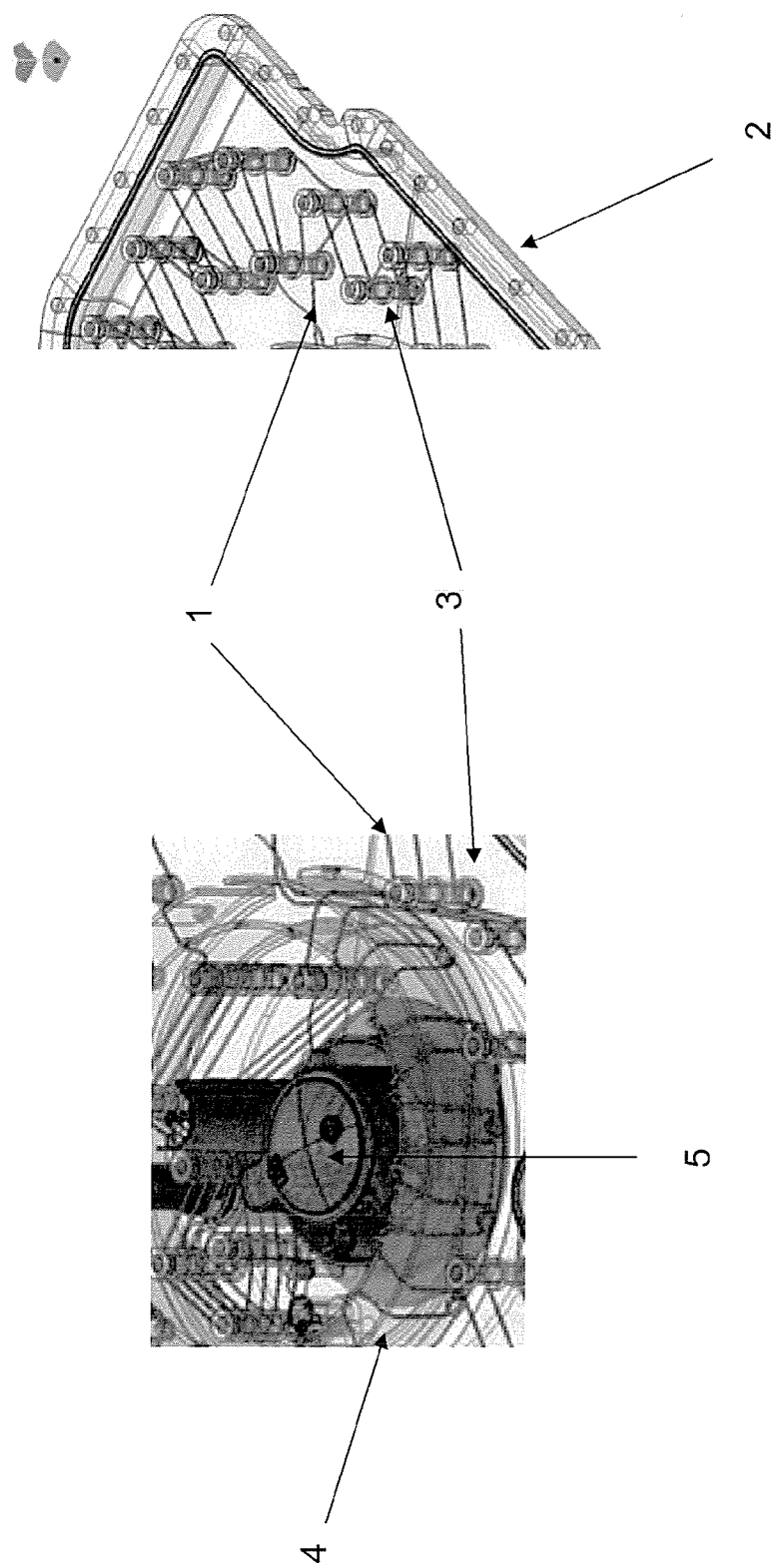

(51) Int. Cl.
*H05B 3/78* (2006.01)
*F01N 13/16* (2010.01)
*F24H 9/18* (2006.01)

(52) U.S. Cl.
CPC ...... *F01N 2530/18* (2013.01); *F01N 2610/10* (2013.01); *F01N 2610/1406* (2013.01); *F24H 9/1818* (2013.01); *Y02T 10/24* (2013.01)

(58) Field of Classification Search
CPC . F01N 2610/1406; F24H 9/1818; H05B 3/56; H05B 3/78
See application file for complete search history.

(56) References Cited

U.S. PATENT DOCUMENTS

| | | | |
|---|---|---|---|
| 4,469,075 A * | 9/1984 | Jackson | F02M 17/20 123/523 |
| 6,065,452 A | 5/2000 | Yoshioka | |
| 6,611,660 B1 * | 8/2003 | Sagal | F28F 1/124 219/546 |
| 6,748,646 B2 * | 6/2004 | Von Arx | A47G 19/2288 219/438 |
| 6,814,921 B1 | 11/2004 | Van Schaftingen et al. | |
| 7,166,253 B2 | 1/2007 | Van Schaftingen et al. | |
| 9,415,681 B2 * | 8/2016 | Sun | B29C 45/14467 |
| 2002/0054934 A1 * | 5/2002 | Yu | B29C 45/2738 425/572 |
| 2004/0067051 A1 * | 4/2004 | Kylberg | B01L 3/5027 392/407 |
| 2008/0217188 A1 * | 9/2008 | Borchert | B29C 47/0023 206/0.6 |
| 2009/0127265 A1 * | 5/2009 | Magnusson | F01N 3/2066 220/564 |
| 2009/0188923 A1 * | 7/2009 | Versaw, Jr. | B60K 13/04 220/564 |
| 2009/0230136 A1 * | 9/2009 | Dougnier | F01N 3/2066 220/592.01 |
| 2010/0107615 A1 * | 5/2010 | Chmielewski | F01N 3/2066 60/303 |
| 2010/0186501 A1 * | 7/2010 | Fink | G01K 1/143 73/431 |
| 2010/0199647 A1 * | 8/2010 | Cruz | F01N 3/2066 60/303 |
| 2011/0064394 A1 * | 3/2011 | Bier | F01N 3/2066 392/441 |
| 2011/0155742 A1 * | 6/2011 | Garcia-Lorenzana | F01N 3/2066 220/562 |
| 2011/0209465 A1 * | 9/2011 | Novellani | F01N 3/2066 60/299 |

FOREIGN PATENT DOCUMENTS

| | | |
|---|---|---|
| DE | 10 2008 001 427 | 10/2009 |
| EP | 0 959 241 | 11/1999 |
| EP | 1 261 473 B1 | 8/2005 |
| EP | 1 872 996 | 1/2008 |
| EP | 2 182 190 | 5/2010 |
| EP | 2 339 138 A1 | 6/2011 |
| EP | 1 728 669 B1 | 4/2014 |
| FR | 2848196 A1 * | 6/2004 |
| JP | 2000-027627 A * | 1/2000 |
| JP | 2004-19507 A | 1/2004 |
| JP | 2005-248824 A | 9/2005 |
| JP | 2010-169082 A | 8/2010 |
| WO | WO 2007/088200 A1 | 8/2007 |
| WO | 2007 126366 | 11/2007 |
| WO | WO 2007/141312 A1 | 12/2007 |
| WO | WO-2008/138960 A1 * | 11/2008 |
| WO | WO 2008/138960 A1 | 11/2008 |

OTHER PUBLICATIONS

Office Action dated Oct. 26, 2015 in Japanese Patent Application No. 2013-545348 (with English language translation).
International Search Report dated Mar. 26, 2012 in PCT/EP11/073546 Filed Dec. 21, 2011.
Office Action dated May 3, 2016 in European Patent Application No. 11 802 933.9.

* cited by examiner

ENGINE EXHAUST GAS ADDITIVE STORAGE SYSTEM

The present application relates to an engine exhaust gas additive storage system.

Legislation concerning emissions from vehicles and heavy duty trucks stipulate, among other things, a reduction in the amount of oxides of nitrogen $NO_x$ discharged into the atmosphere. One known way to achieve this requirement is to use SCR (selective catalytic reduction) which allows for reduction of the oxides of nitrogen by injecting a reducing agent, generally ammonia, into the exhaust system. This ammonia may originate from the thermal decomposition of a solution of an ammonia precursor, the concentration of which may be the eutectic concentration. An ammonia precursor such as this is generally a solution of urea.

Using the SCR method, the high levels of $NO_x$ produced in the engine during combustion at optimized efficiency are treated in a catalytic converter as they leave the engine. This treatment requires the use of the reducing agent at a precise concentration and extreme quality. The solution is thus metered accurately and injected into the exhaust gas stream where it is hydrolysed before converting the oxide of nitrogen ($NO_x$) into nitrogen ($N_2$) and water ($H_2O$).

To do this, it is necessary for the vehicles to be equipped with a tank containing a solution of additive (generally an aqueous urea solution) and with a device for metering and injecting the desired amount of additive into the exhaust system.

In order to be able to meter the solution of additive correctly into the exhaust gases, it is known practice to incorporate into the additive tank elements such as a level gauge, a temperature sensor, a quality sensor, a resistive heating element, etc.

Patent application WO 2007/141312 in the name of the applicant discloses such a tank comprising an "immersed" flange positioned through an opening made in the bottom wall of the tank, which is preferably a blow moulded tank made from HDPE (High Density Poly Ethylene), said flange comprising at least one orifice through which a system for injecting the said additive into the exhaust gases can be fed, and also incorporating at least one other active component of the storage system and/or of the injection system. In a preferred embodiment, this flange integrates a liquid trap from where the pump sucks liquid additive. Patent application EP 09180726.3 published under U.S. 2011/0155742 additionally describes how a heater (shaped as a resistive heating wire) can advantageously be integrated to such a flange.

Although such systems have proven in practice to work very well and to be relatively easy to assemble, they imply the fact that the support for the heater is the flange and this limits the extent to which said heater can occupy space in the tank and as such, the volume of additive that can be heated. It also implies a step of mounting the flange on a tank opening.

The idea behind the present invention is to find a tank geometry allowing to easily insert a heater which can extend much more broadly into the tank interior and/or enabling (if required) not to use an immersed flange but instead, to realise the direct connection of the pump module through an opening in the tank.

This problem is solved by conceiving the tank as two halve shells which are manufactured as two separate parts that are only assembled when at least one internal component (and preferably: all of them) have been inserted/positioned on at least one of them.

The object of the invention is therefore a system for storing an internal combustion engine exhaust gas liquid additive, and comprising a tank for storing the additive, said tank being made as two halve shells which are manufactured as two separate parts which are assembled, at least one of said shells comprising an active component fixed inside of it.

In a preferred embodiment, the lower and/or the upper shell integrate(s) a heater for which said tank shell is an essential part assuring either a support for said heater, or the heating itself by conductivity (for heat generation by passing current through at least part of the tank wall which would be made of conductive material), or even: a combination of both.

Said integration may be done through the inside and/or through the outside of the tank.

The terms "lower shell" are in fact, in the context of the invention, intended to denote the bottom half of the tank (when in use), and similarly, the terms "upper shell" are intended to denote the top half of the tank.

The additive to which the invention relates is an additive that is liquid under normal conditions of use. It is preferably a reducing agent capable of reducing the $NO_x$ present in the exhaust gases of internal combustion engines, and more preferably, urea. The term "urea" is understood to mean any, generally aqueous, solution containing urea. The invention gives good results with eutectic water/urea solutions for which there is a standard quality: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the Adblue® solution. The latter have the advantage of only freezing from −30° C. onwards (as opposed to −11° C.), but have the disadvantages of corrosion problems linked to the possible release of formic acid. The present invention is particularly advantageous in the context of eutectic water/urea solutions.

The present invention may be applied to any internal combustion engine likely to generate $NO_x$ in its exhaust gases. This may be an engine with or without a fuel return line (that is to say a line returning any surplus fuel not used by the engine to the fuel tank). It is advantageously applied to diesel engines and, in particular, to diesel engines of vehicles.

According to the invention, the tank is made of two shells. Preferably, at least one of these shells is made by injection moulding a plastic and even more preferably: they both are.

In a preferred embodiment, the lower shell is made by injection moulding and it integrates (as moulded in one piece with it) the above mentioned liquid trap.

The liquid trap (either moulded in one piece with the lower shell or being fixed on an opening through it) is, in particular, highly suited for supporting accessories which pass through the wall of the hollow body and/or are positioned inside the latter. It has a perimeter that is closed up on itself, of any shape. Usually, its perimeter is of circular shape. Preferably, the bottom of this liquid trap comprises at least one orifice through which a system for injecting the said additive into the exhaust gases can be fed. This feed may be achieved simply under gravity via an injection line passing through said orifice. Alternatively and as a preference, the system is fed by a pump. The above mentioned orifice may be made directly in the tank wall when said trap is integrated to the lower shell thereof, or it may be pierced through an immersed flange as described above.

As a preference, the lower shell of the tank according to the invention (and even more preferably: the liquid trap fixed or integrated thereto) incorporates several components that are active in storage and/or metering and even more preferably, it incorporates/supports most of the active components which need to be in contact with the liquid additive inside, leaving or entering the additive tank.

As a preference, the component is chosen from the following group: a pump; a filter; a level gauge; a heater; a temperature sensor; a quality sensor; a pressure sensor; a pressure regulator; a venturi tube.

As for the heater, it may comprise a heat exchanger of given capacity, or a resistive heating element. Said heater may for instance be a flexible heater exhibiting a multilayer structure consisting of a resistive element insulated between two layers of elastomer (silicone for instance). The use of a flexible heater allows it to be adapted to suit a great many flanges. In particular, in the event that the flange comprises nipples, the heater is equipped with tabs which can be inserted inside the nipples of the flange thus avoiding plugs from forming at low temperatures if the solution of precursor freezes. Such heaters and their use in SCR systems is described in more detail in patent application WO 2008/138960 in the name of the applicant, the content of which is incorporated by reference in the present application.

According to a preferred embodiment, the heater comprises a resistive wire as described in the above mentioned US 20110155742 patent application, the content of which is also incorporated by reference in the present application. In a preferred sub-embodiment, the resistive wire is mounted on a support, preferably a flexible net, which is in turn mounted on a part integral with one of the tank shells. Preferably, said support is mounted in/on the afore mentioned liquid trap as described in said US application.

Preferred embodiments of the present invention consists of: a wire heater positioned inside at least one of the tank shells, a wire heater positioned outside at least one of the tank shells, or a combination of both.

The options where the wire is inside at least one of the tank shells is considered as the most attractive as there is direct contact between the heater and the NH3 precursor.

The present invention also relates to a method for manufacturing a system as described hereinabove. In particular, it relates to a method for manufacturing the storage tank of this system, said method comprising the following steps:
    injection-moulding two plastic shells;
    fixing at least one active component in at least one of the shells;
    assembling both shells, preferably by welding their edges together.

The plastic may be HDPE; alternatively, it may be a polyacetal and, in particular, POM (polyoxymethylene); a polyphtalamide (an AMODEL® resin for instance); or a polyamide (for example nylon-6,6). In particular, reinforced grades (for example glass-fibre-reinforced plastics) may be used.

In a preferred embodiment, at least the lower shell of the tank is equipped with means for fixing a heating wire to it. Said means may for instance be upstanding pins preferably bearing slots, grooves, supporting baffles or the like, where the wire can easily be fixed (for instance by means of a robot) before the shells are assembled. Preferably, these pins are moulded in one piece with the tank shell (preferably by injection moulding).

The present invention is illustrated more in detail and in a non limitative way by FIGS. 1 to 5 attached which illustrate a number of preferred variants thereof.

Figure 2:
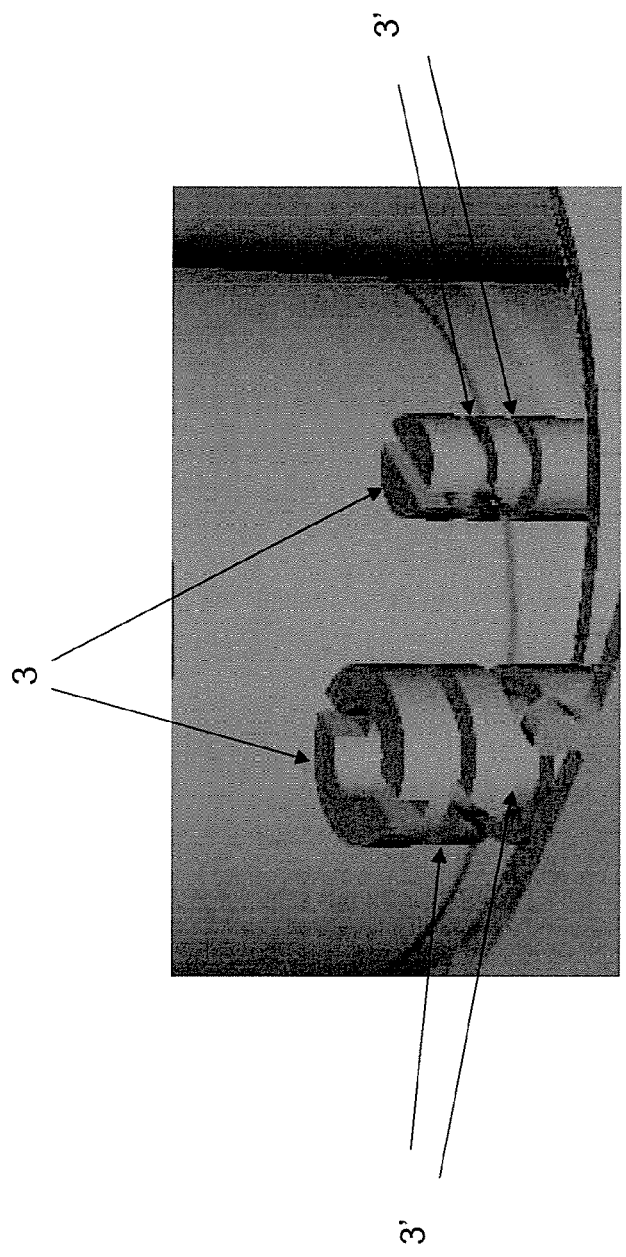
Figure 3:
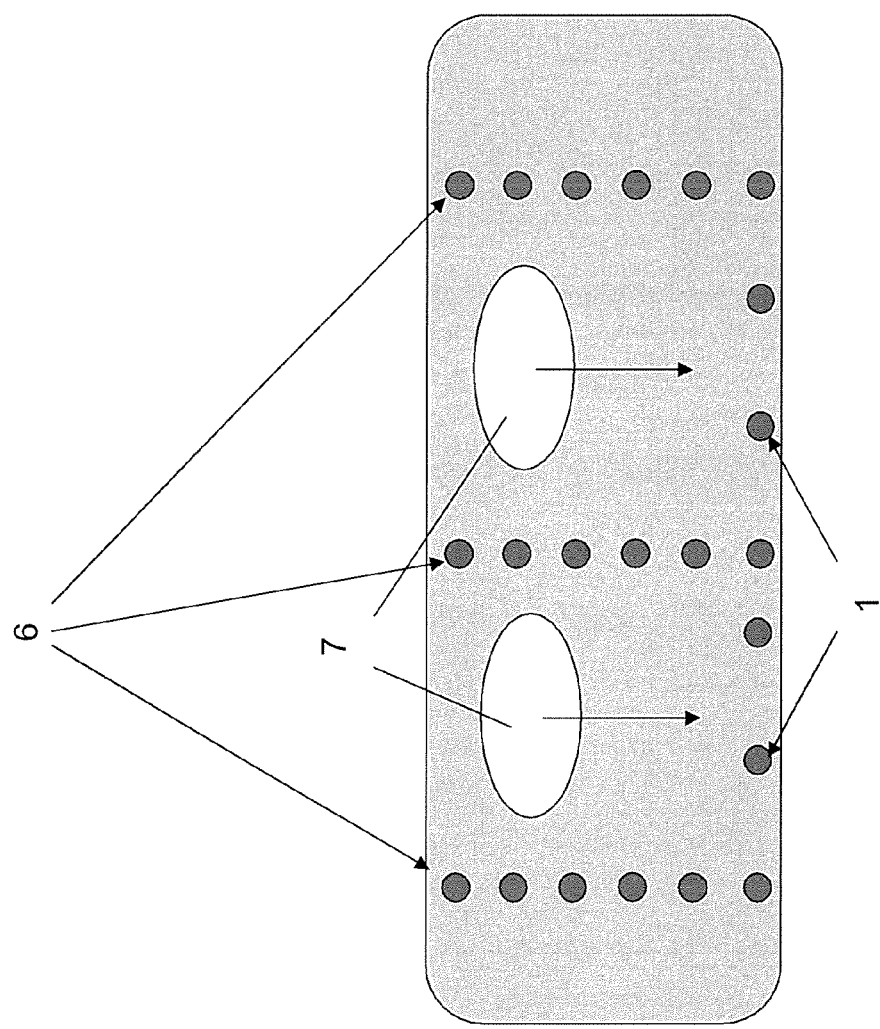
Figure 4:
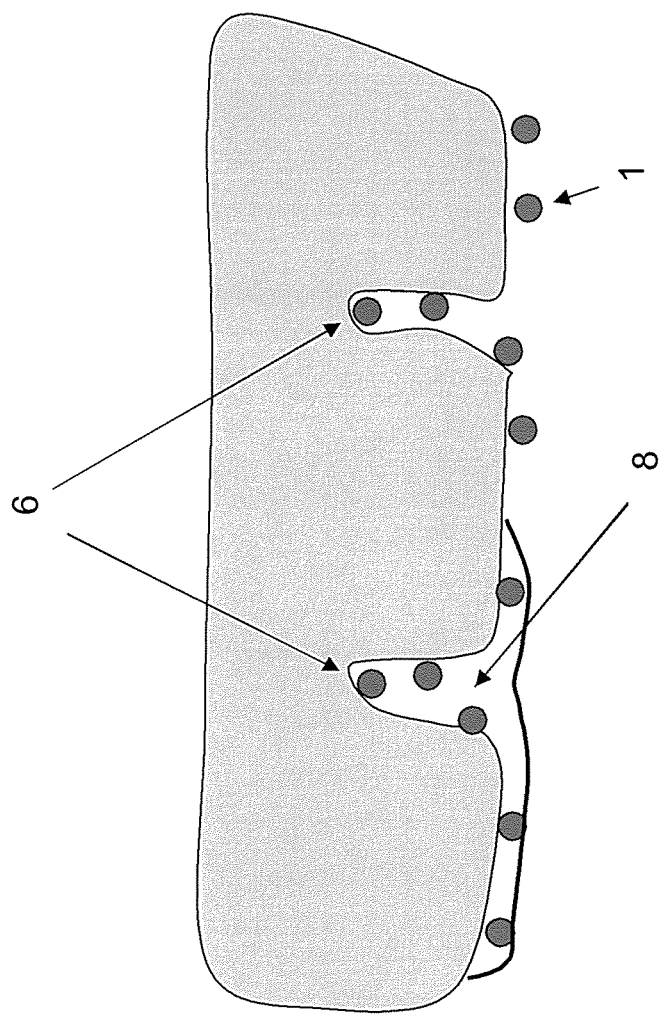
Figure 5:
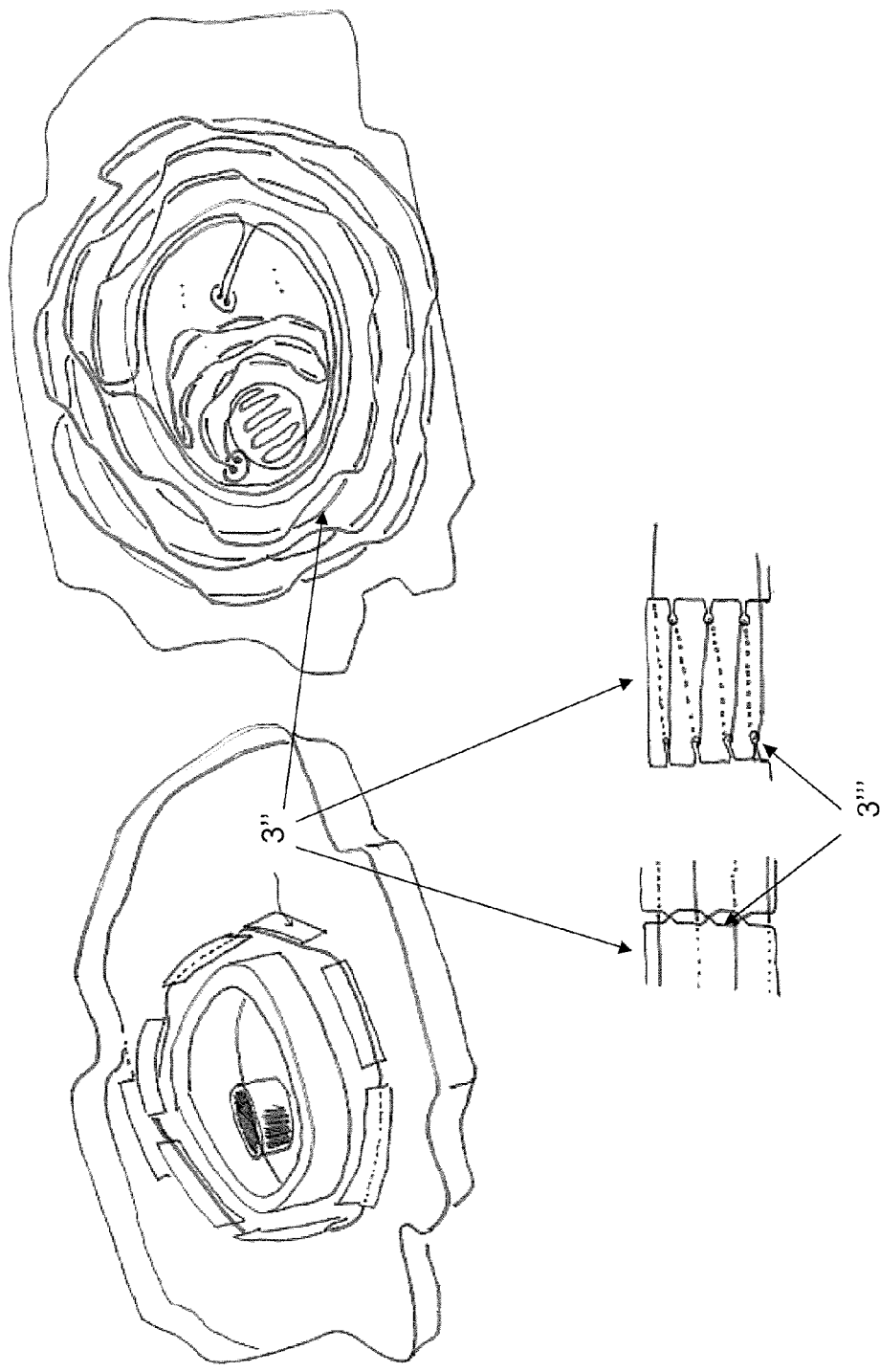

FIG. 1 shows 2 partial views of a lower tank shell equipped with a resistive heating wire; FIG. 2 shows a detail of an embodiment of fixing means of said wire; FIG. 3 shows a schematic vertical cut through a tank equipped with a resistive heating wire in a given configuration; FIG. 4 shows an embodiment where the heating wire is external to the tank (embodiment that is also interesting independently of the invention claimed in the present application); and FIG. 5 shows an embodiment with a different fixing means than the one illustrated in FIGS. 1 and 2.

FIG. 1 shows how a heating wire (1) is fixed inside the lower shell (2) of a tank by means of vertical pins (3) bearing several portions in relief (3', see detail in FIG. 2) so that the heating wire can be wound around them several times, increasing the volume of liquid that can be thawed. The left view shows a liquid trap (4) moulded in one piece with the lower shell (2) into which a pump (5) is fixed. The right view is a side view of the shell.

The configuration shown in these views allows covering a large portion of the tank (typically at least 10%, more preferably at least 50% and ideally up to 100% of the lower tank shell) so that most of the AdBlue® solution can be thawed. The embodiment shown there and in FIGS. 2 and 3, can include at least one of the following options:
- the wire can be fixed inside the shell in one or multiple layers
- the holding means can allow wire attachment with a robot
- said holding means can be integrally made with the tank shell (preferably by injection moulding)
- there can be a baffle protection to avoid damage resulting from ice or liquid displacements
- the wire may be in single or multiple circuits electrically independent; the portion near the suction pump can be activated first, followed by periphery
- the wire(s) can have a PTC effect
- the wire(s) can have a protective layer resistant to the NH3 precursor (AdBlue or other)
- the wire(s) may be positioned mainly at the bottom of the tank, but with portions placed upwards (see 6 in FIG. 3) insuring that blocks of ice (see 7 in FIG. 3) are cut up to the top of the tank so that they can fall down (see arrows) and melt
- the wire(s) can be attached or put along a small tube whose fast thawing allows to insure fast feeding of the pump/exhaust system
- the wire(s) may be partially or totally mounted on an intermediate mesh allowing fast mounting in the tank shell
- the wire(s) can be attached to the lower or to the upper shell only In the frame of the present invention, the tank is made from half shells (injected (preferred)), but the use of a preassembled mesh could also be applied to a tank which is a single element (blow moulded for instance) where a preassembled mesh would be inserted and fixed. This could be done for a tank moulded from a single, tubular parison (but would imply insertion through a hole made there through), but it can more easily be done when and while the tank is moulded from two separate sheets, for instance using the process called TSBM, or Twin Sheet Blow Moulding, developed by the applicant (see for instance patents EP 1728669 and EP 1261473, and patent application WO 2007/088200 in the name of the applicant, the content of which is incorporated by reference in the present application).

In the embodiment of FIG. 4, the wire is external to the tank and although it can be used in the frame of the present invention (with a tank moulded as two half shells), it applies as well to tanks moulded as single pieces.

The embodiment shown therein can include at least one of the following options:
- external holding means for allowing wire attachment with a robot
- baffle protection to avoid damage resulting external conditions
- wire embedded in conductive material to insure good thermal contact with tank shell
- wire in single or multiple circuits electrically independent
- wire(s) with PTC effect
- wire with a protective layer/material (8) resistant to the environment; optionally, this material can be a good thermal conductor
- wire (1) positioned mainly at the bottom of the tank, but with portions (6) moving upwards inside baffles and insuring that blocks of ice are cut up to the top of the tank
- wire partially or totally mounted on intermediate mesh allowing fast mounting on the tank shell
- wire attached to the lower or upper shell only (but lower interest for the latter).

Tank shell can be made from half shells (injected (preferred)), or as a single element (blow moulded).

FIG. 5 shows an embodiment with a different fixing means than the one illustrated in FIGS. 1 and 2, namely: with small baffles (3") instead of vertical pins (3), said baffles (3") also having portions in relief (3''')—which may for instance be holes (left bottom view) or indentations (right bottom view)—to fix the wire.

The invention claimed is:

1. A storage system for storing an internal combustion engine exhaust gas liquid additive, and comprising:
    a tank to store the additive, the tank including a lower half shell and an upper half shell that are manufactured as two separate parts and that are only assembled when at least one internal component has been inserted/positioned on at least one of the two separate parts,
    wherein the at least one internal component is a heater fixed on the lower and/or upper shell, at least one of the lower or upper shells is made by injection molding a plastic, the lower and upper shells are assembled by welding their edges together, and a support of the heater bears several portions in relief so as to increase the volume of the additive that can be thawed.

2. The storage system according to claim 1, wherein the lower and/or the upper shell integrate a heater for which the lower and/or the upper shell is an essential part assuring either a support for the support of the heater, or the heating itself by passing current through at least part of the lower and/or the upper shell which would be made of conductive material, or a combination of both.

3. The storage system according to claim 1, wherein the lower shell is made by injection molding and integrates a liquid trap.

4. The storage system according to claim 1, wherein the heater is a flexible heater.

5. The storage system according to claim 1, wherein the heater is a resistive wire.

6. The storage system according to claim 5, wherein the resistive wire is positioned inside at least one of the lower and the upper shells and/or outside at least one of the lower and the upper shells.

7. The storage system according to claim 5, wherein the resistive wire is mounted on the support, or a flexible net, which is in turn mounted on a part integral with one of the lower and the upper shells.

8. The storage system according to claim 7, wherein the resistive wire support is mounted in/on a liquid trap integrated in one of the lower and the upper shells.

9. The storage system according to claim 5, wherein the resistive wire can be wound around the several portions.

10. The storage system according to claim 9, wherein the resistive wire can be wound around each of the several portions several times.

11. A method for manufacturing a storage system according to claim 1, the method comprising:
    injection-molding two plastic shells;
    fixing at least one internal component in at least one of the shells, wherein the at least one internal component is a heater, and wherein a support of the heater bears several portions in relief so as to increase the volume of the additive that can be thawed:
    only once the at least one active component has been fixed in at least one of the shells, assembling both shells by welding the edges together.

12. The method according to claim 11, wherein at least the lower shell of the tank includes upstanding pins and/or baffles as the support of the heater.

13. The method according to claim 12, wherein the pins/baffles are molded in one piece with the tank shell or are molded by injection molding.

14. The method according to claim 11, wherein the heater is mounted on the support, or a flexible net, which is in turn mounted on a part integral with one of the tank half shells.

15. The method according to claim 14, wherein the heater support is mounted in/on a liquid trap integrated in one of the tank half shells.

* * * * *